United States Patent
Edmonds et al.

(10) Patent No.: US 9,957,981 B1
(45) Date of Patent: May 1, 2018

(54) TURBOCHARGER HAVING COMPRESSOR PORTION WITH IMBALANCE CORRECTION REGION

(71) Applicant: BorgWarner Inc., Auburn Hills, MI (US)

(72) Inventors: Paul Edmonds, Asheville, NC (US); Thomas Harris, Boiling Springs, SC (US)

(73) Assignee: BORGWARNER INC., Auburn Hills, MI (US)

( * ) Notice: Subject to any disclaimer, the term of this patent is extended or adjusted under 35 U.S.C. 154(b) by 0 days. days.

(21) Appl. No.: 15/486,451

(22) Filed: Apr. 13, 2017

(51) Int. Cl.
  *F04D 29/66* (2006.01)
  *F01D 5/02* (2006.01)
  *F04D 29/28* (2006.01)
  *F01D 5/04* (2006.01)
  *F04D 29/053* (2006.01)

(52) U.S. Cl.
  CPC ........... *F04D 29/662* (2013.01); *F01D 5/027* (2013.01); *F01D 5/043* (2013.01); *F04D 29/053* (2013.01); *F04D 29/284* (2013.01); *F05D 2220/40* (2013.01)

(58) Field of Classification Search
  CPC .... F04D 29/662; F04D 29/053; F04D 29/284; F01D 5/027; F01D 5/043; F05D 2220/40
  USPC ...................... 417/407; 416/244 A; 60/605.1
  See application file for complete search history.

(56) References Cited

U.S. PATENT DOCUMENTS

| | | | | |
|---|---|---|---|---|
| 4,872,817 A | * | 10/1989 | De Kruif | F01D 5/025 416/244 A |
| 5,193,989 A | * | 3/1993 | Fleury | F01D 5/025 416/204 A |
| 5,503,521 A | * | 4/1996 | Capon | F04D 29/2272 415/121.1 |
| 8,801,379 B2 | | 8/2014 | Allen et al. | |
| 8,944,771 B2 | * | 2/2015 | Lischer | F01D 5/027 416/204 R |

(Continued)

FOREIGN PATENT DOCUMENTS

| | | |
|---|---|---|
| DE | 102015103670 B4 | 12/2016 |
| JP | H07071202 A | 3/1995 |
| WO | WO2010133396 A2 | 11/2010 |

OTHER PUBLICATIONS

English language Abstract and Machine-Assisted English language translation for DE102015103670 B4 extracted from the Lexis TotalPatent database on Mar. 23, 2017; 8 pages.

(Continued)

*Primary Examiner* — Hoang Nguyen
(74) *Attorney, Agent, or Firm* — Howard & Howard Attorneys PLLC

(57) ABSTRACT

A turbocharger includes a turbine wheel portion to receive exhaust gas from an internal combustion engine, a turbocharger shaft coupled to and rotatable by the turbine wheel portion, the turbocharger shaft extending along a longitudinal axis, and a compressor wheel portion coupled to and rotatable by the turbocharger shaft. The compressor wheel portion includes a symmetrical leading edge region facing airflow and an imbalance correction region disposed longitudinally inboard from the symmetrical leading edge region and extending radially inward to correct an imbalance of the turbocharger shaft and to reduce aero-acoustic noises.

15 Claims, 12 Drawing Sheets

(56) References Cited

U.S. PATENT DOCUMENTS

| | | | |
|---|---|---|---|
| 2008/0101929 A1* | 5/2008 | Allen | F01D 5/027 415/229 |
| 2014/0147306 A1 | 5/2014 | Yamashita et al. | |
| 2015/0167695 A1 | 6/2015 | Saito | |
| 2015/0219121 A1* | 8/2015 | King | F16B 43/00 415/119 |
| 2015/0361993 A1 | 12/2015 | An et al. | |

OTHER PUBLICATIONS

English language Abstract and Machine-Assisted English language translation for JPH07071202A extracted from the Lexis TotalPatent database on Mar. 23, 2017; 8 pages.

English language Abstract and Machine-Assisted English language translation for WO2010133396A2 extracted from the Lexis TotalPatent database on Mar. 23, 2017; 13 pages.

\* cited by examiner

TURBOCHARGER HAVING COMPRESSOR PORTION WITH IMBALANCE CORRECTION REGION

BACKGROUND OF INVENTION

1. Field of Invention

The present invention relates generally to turbochargers and, more specifically, to a turbocharger having a compressor portion with an imbalance correction region to improve NVH and rotor stability performance.

2. Description of the Related Art

It is known to provide a turbocharger for an engine of a vehicle such as an automotive vehicle. An automotive turbocharger typically consists of a compressor wheel and a turbine wheel on a common turbocharger shaft supported by bearings in a center housing. The turbocharger extracts some of the energy in the exhaust gas, and transfers this power to the compressor wheel. The compressor wheel increases the intake air density into the engine, and thereby the engine power.

Some turbochargers have the compressor wheel threaded onto the shaft. Other turbochargers have the compressor wheel disposed about the shaft and a compressor nut to secure the compressor wheel to the shaft. A standard compressor nut features an outboard cylindrical region with the purpose of imbalance correction. This standard compressor nut with the imbalance correction can create aero-acoustic noises such a first order pulsation noise.

Therefore, it is desirable to provide a turbocharger with a compressor portion to reduce aero-acoustic noises. It is also desirable to provide a turbocharger with a compressor portion having an imbalance correction that prevents first order pulsation noise. It is further desirable to provide a turbocharger with a compressor portion including a compressor nut with an imbalance correction region that prevents first order pulsation noise. Thus, there is a need in the art to provide a turbocharger with a compressor portion that meets at least one of these desires.

SUMMARY OF THE INVENTION

The present invention provides a turbocharger including a turbine wheel portion to receive exhaust gas from an internal combustion engine, a turbocharger shaft coupled to and rotatable by the turbine wheel portion, the turbocharger shaft extending along a longitudinal axis, and a compressor wheel portion coupled to and rotatable by the turbocharger shaft. The compressor wheel portion includes a symmetrical leading edge region facing airflow and an imbalance correction region disposed longitudinally inboard from the symmetrical leading edge region and extending radially inward to correct an imbalance of the turbocharger shaft and to reduce aero-acoustic noises.

The present invention also provides a turbocharger including a turbine wheel to receive exhaust gas from an internal combustion engine, a turbocharger shaft coupled to and rotatable by the turbine wheel, the turbocharger shaft extending along a longitudinal axis, and a compressor wheel coupled to and rotatable by the turbocharger shaft to deliver compressed air to the internal combustion engine. The compressor wheel extends along the longitudinal axis from a wheel end facing the turbine wheel to a nose end facing airflow spaced longitudinally from the wheel end. The nose end includes a symmetrical leading edge region facing the airflow and an imbalance correction region disposed longitudinally inboard from the symmetrical leading edge region and extending radially inward to correct an imbalance of the turbocharger shaft and to reduce aero-acoustic noises.

The present invention further provides a turbocharger including a turbine wheel to receive exhaust gas from an internal combustion engine, a turbocharger shaft coupled to and rotatable by the turbine wheel, the turbocharger shaft extending along a longitudinal axis, and a compressor wheel coupled to and rotatable by the turbocharger shaft to deliver compressed air to the internal combustion engine. The compressor wheel extends along the longitudinal axis from a wheel end facing the turbine wheel to a nose end facing airflow spaced longitudinally from the wheel end. The turbocharger also includes a compressor nut having a balance portion disposed about the turbocharger shaft adjacent the nose end of the compressor wheel and a fastener portion disposed about and coupled to the turbocharger shaft adjacent the balance portion such that the balance portion is disposed between the fastener portion and the nose end of the compressor wheel to fasten the compressor wheel to the turbocharger shaft. The fastener portion has a symmetrical leading edge region facing the airflow and the balance portion has an imbalance correction region disposed longitudinally inboard from the symmetrical leading edge region and extending radially inward to correct an imbalance of the turbocharger shaft and to reduce aero-acoustic noises.

One advantage of the present invention is that a turbocharger is provided having a compressor portion with an imbalance correction region to improve NVH and rotor stability performance. Another advantage of the present invention is that the compressor portion has a symmetric leading edge region that does not generate a pulsation noise or other aero-acoustic issues. Yet another advantage of the present invention is that the compressor portion has an imbalance correction region disposed longitudinally inboard from an outboard edge or symmetric leading edge region to preserve a continuity of a leading edge. Still another advantage of the present invention is that the symmetric leading edge region is used to protect the imbalance correction region such as a balance cut from causing a disturbance in the airflow which may cause aero-acoustic noises. A further advantage of the present invention is that the compressor portion can have the imbalance correction region positioned in any region longitudinally inboard from the symmetric leading edge region.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
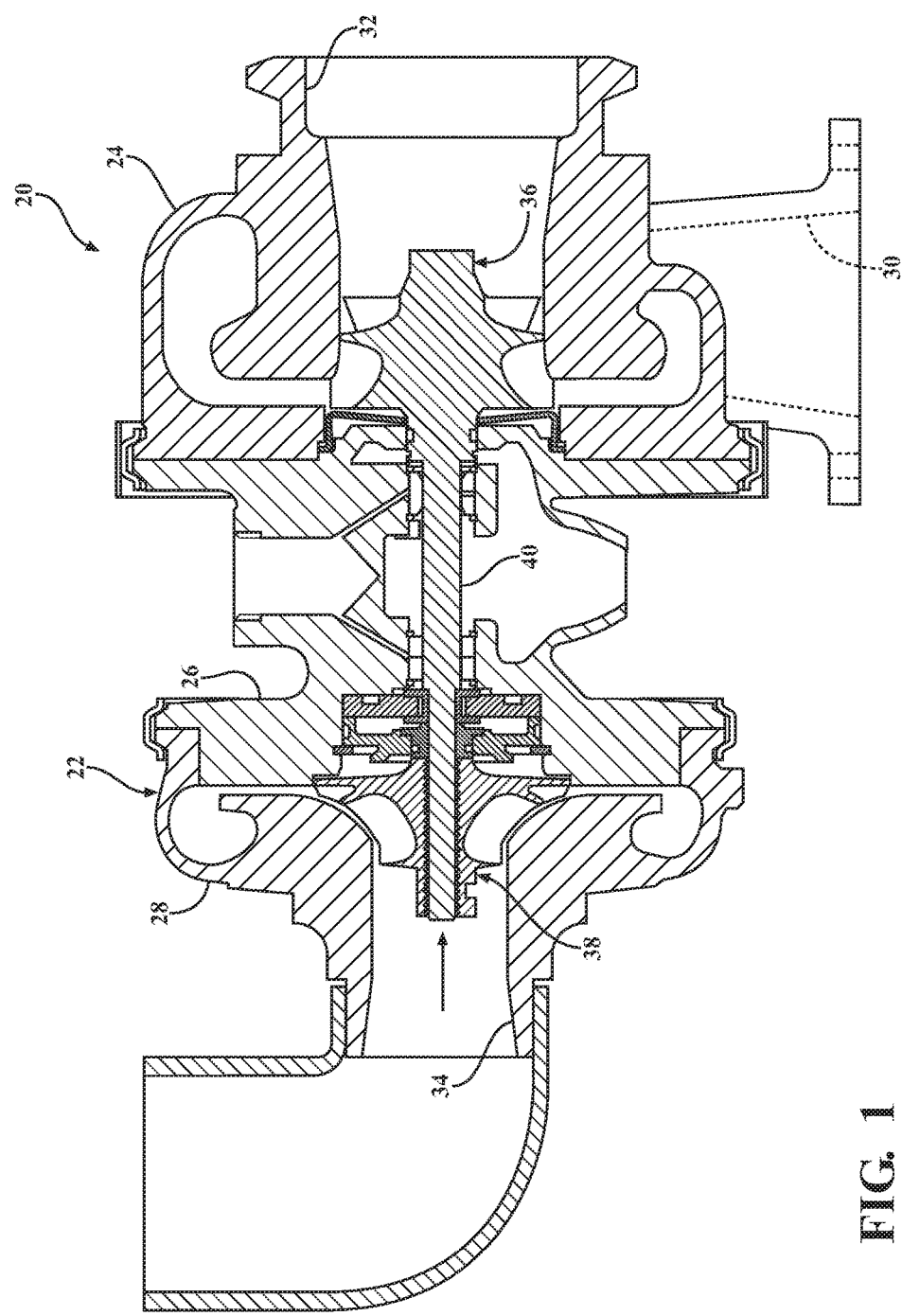
FIG. 1 is a sectional view of a turbocharger, according to one embodiment of the present invention.
Figure 2:
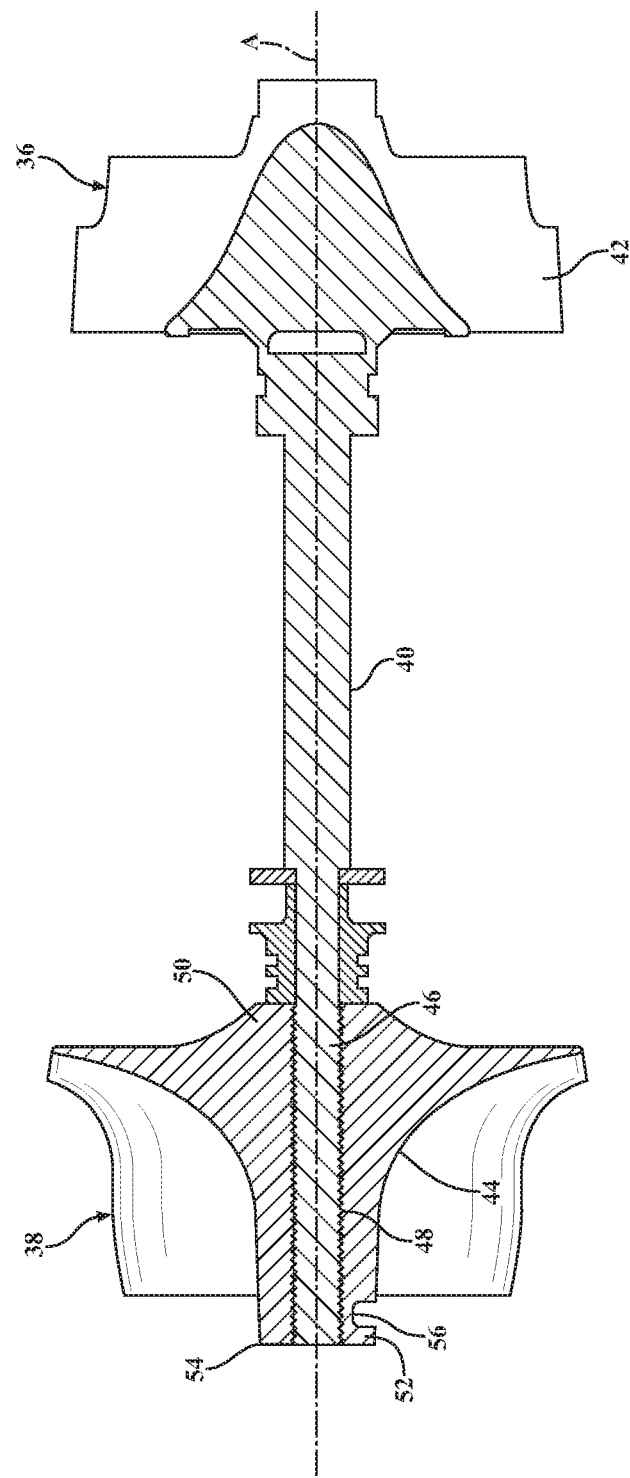
FIG. 2 is an enlarged view of a portion of the turbocharger of FIG. 1.
Figure 3:
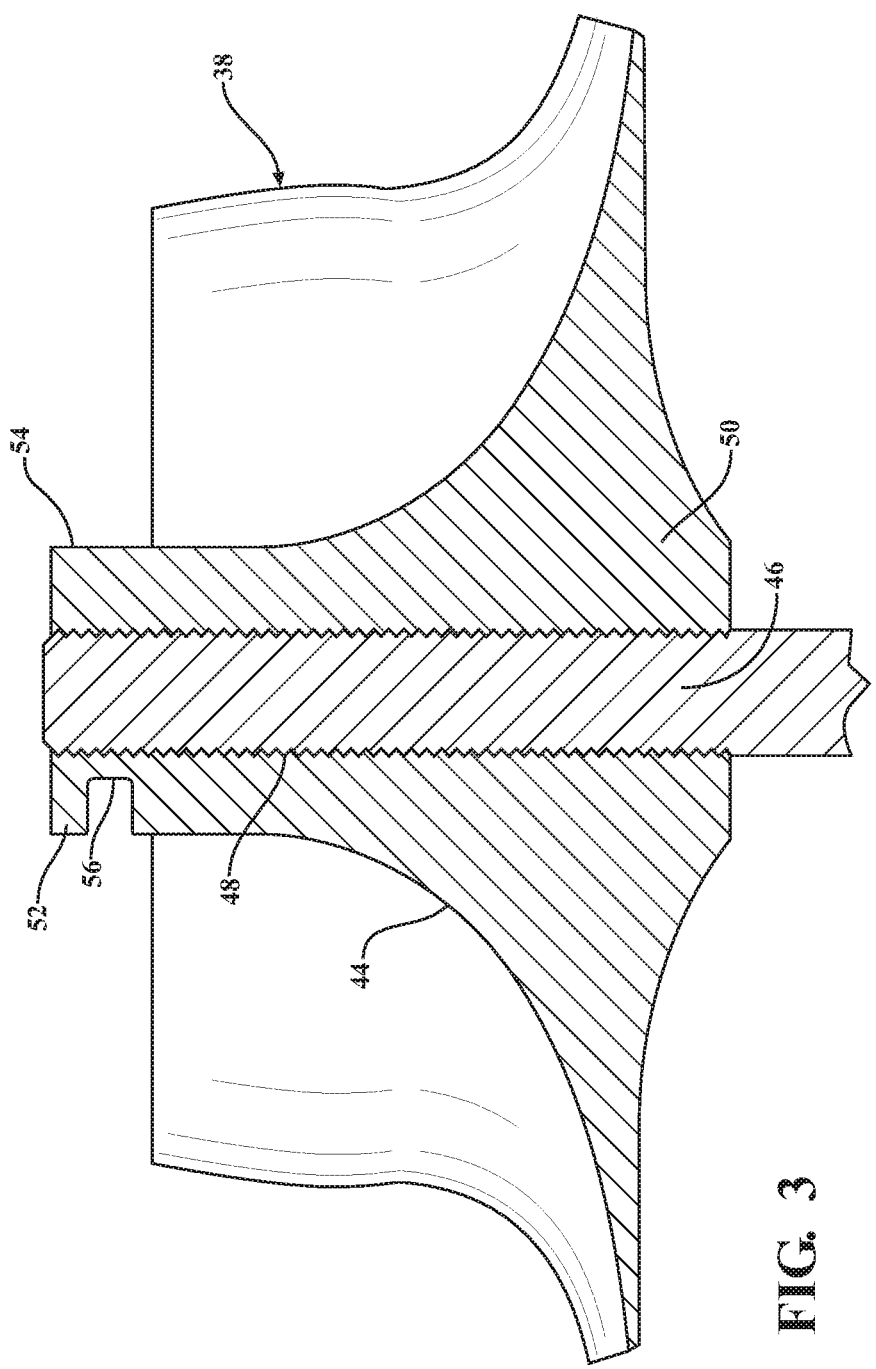
FIG. 3 is an enlarged view of one end of the portion of FIG. 2.
Figure 4:
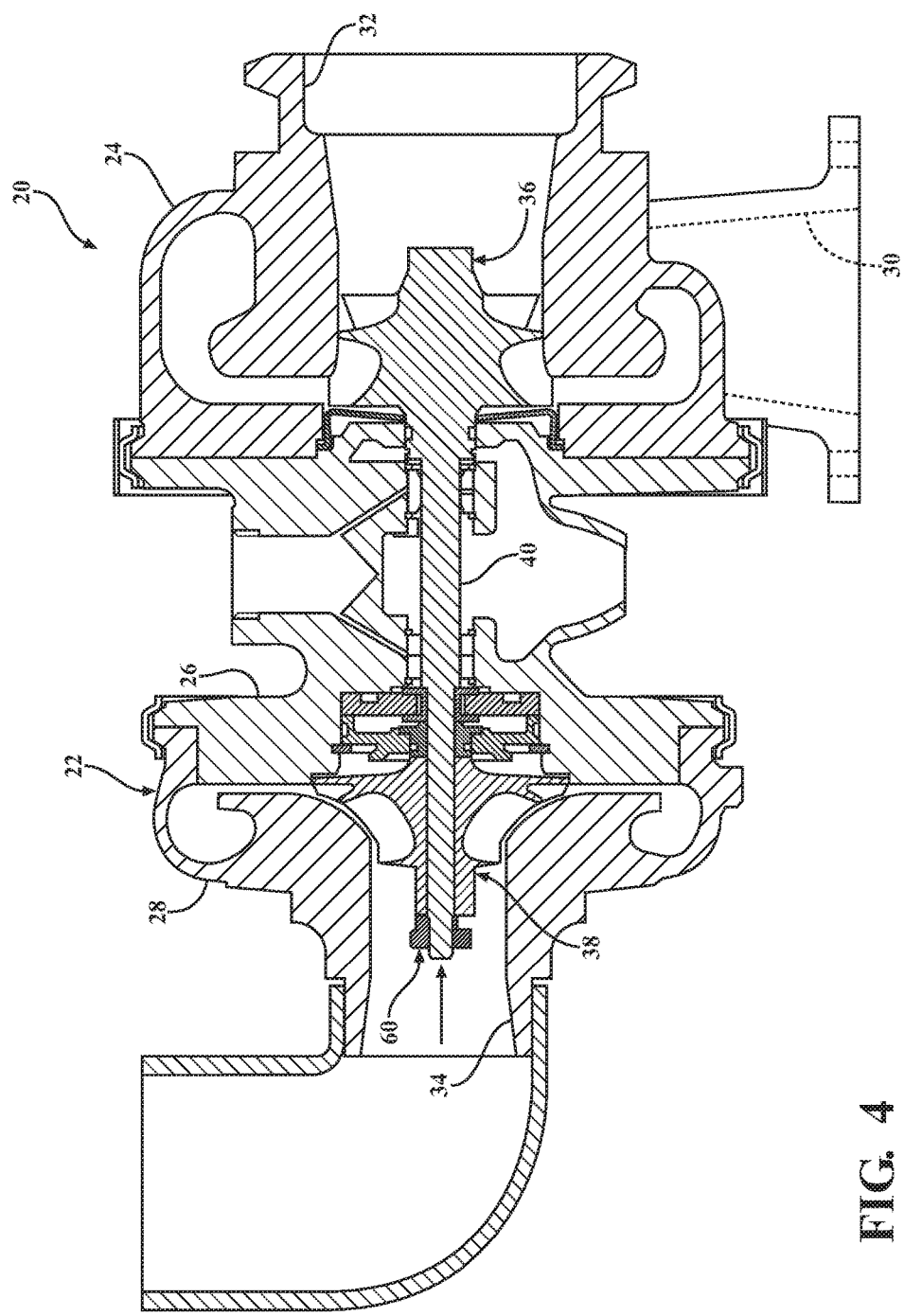
FIG. 4 a sectional view of a turbocharger, according to another embodiment of the present invention.
Figure 5:
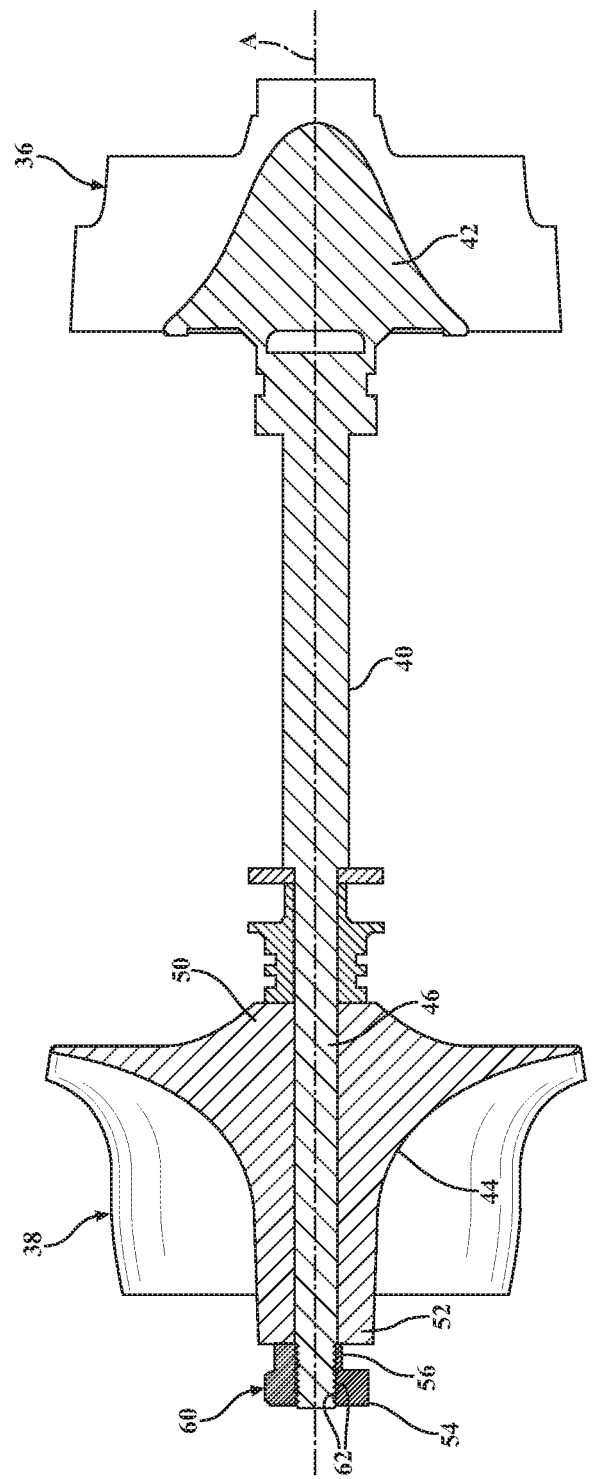
FIG. 5 is an enlarged view of a portion of the turbocharger of FIG. 4.
Figure 6:
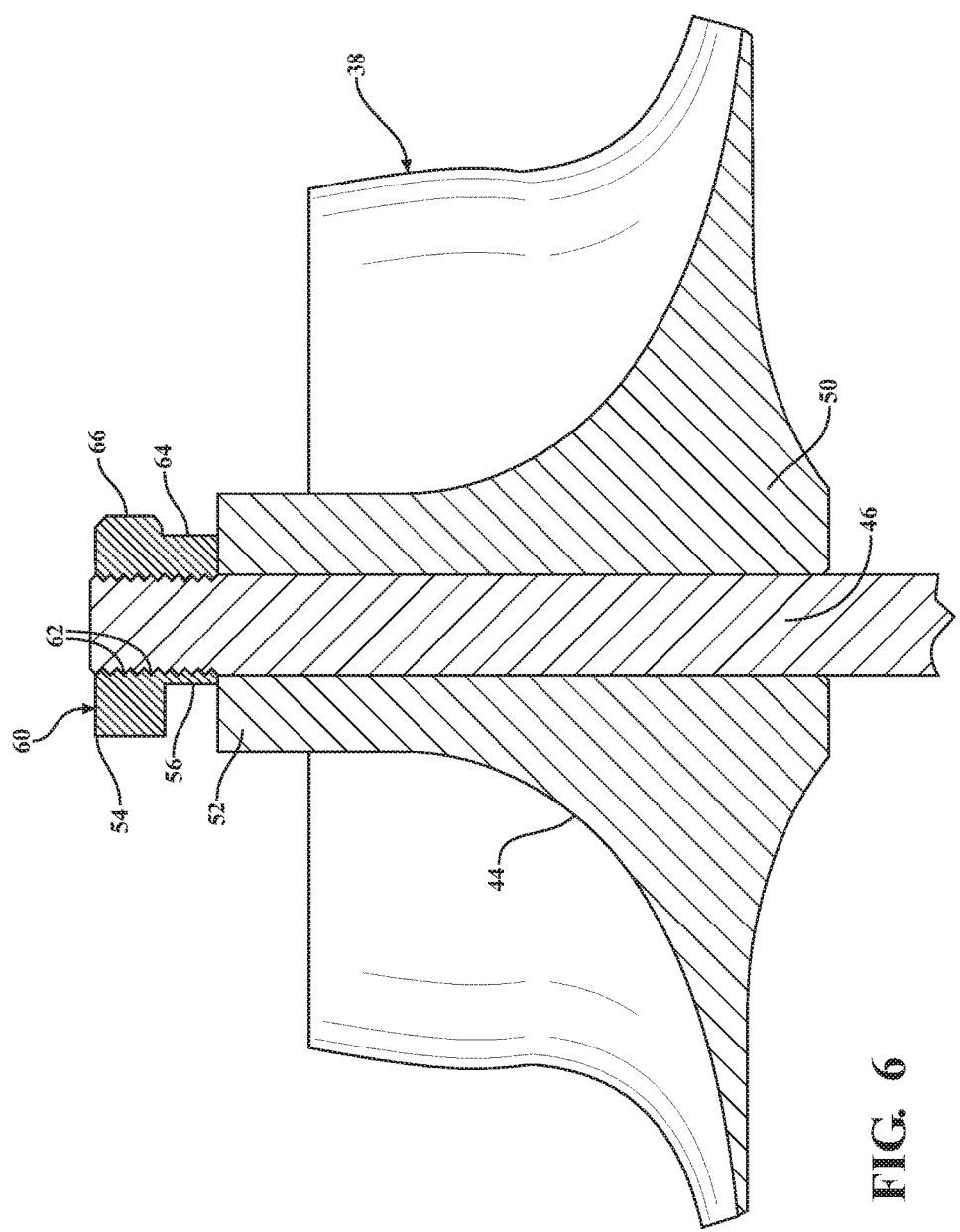
FIG. 6 is an enlarged view of one end of the portion of FIG. 5.
Figure 7:
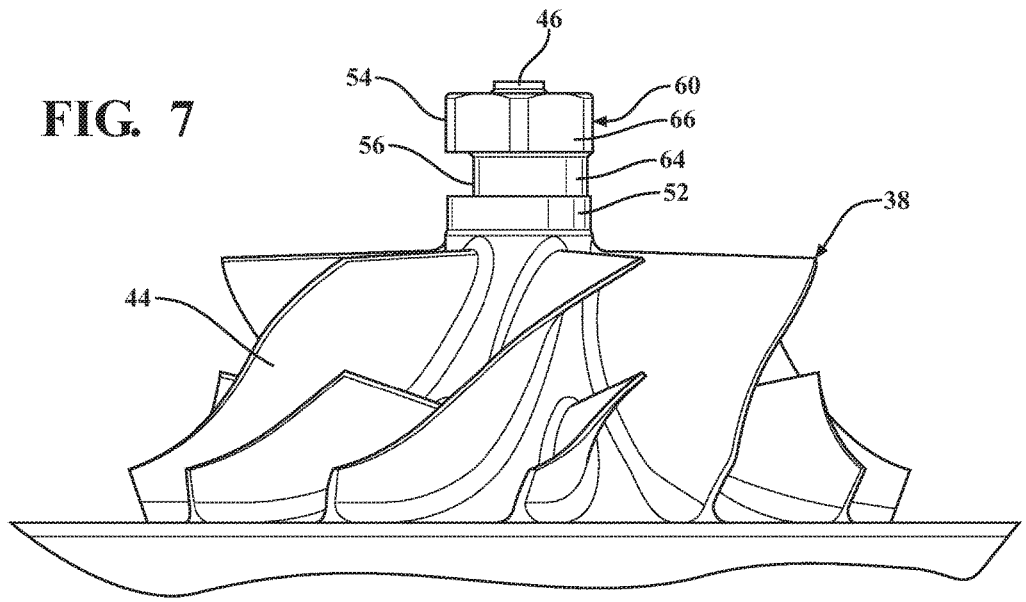
FIG. 7 is an elevational view of one end of the portion of FIG. 5 illustrating a compressor nut.
Figure 8:
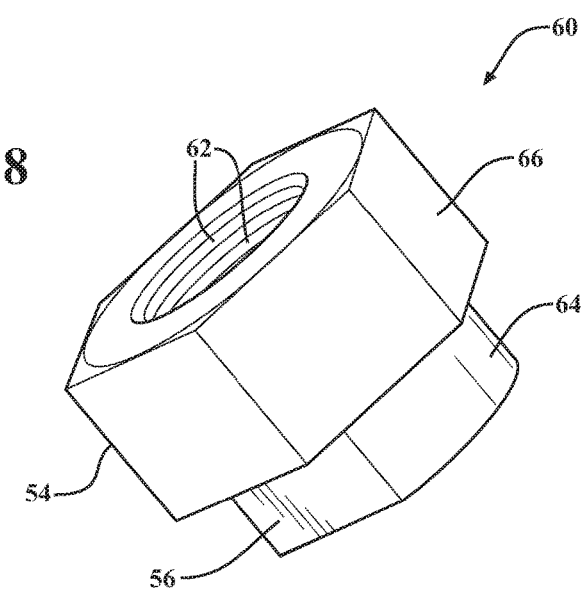
FIG. 8 is a perspective view of the compressor nut of FIG. 7.
Figure 9:
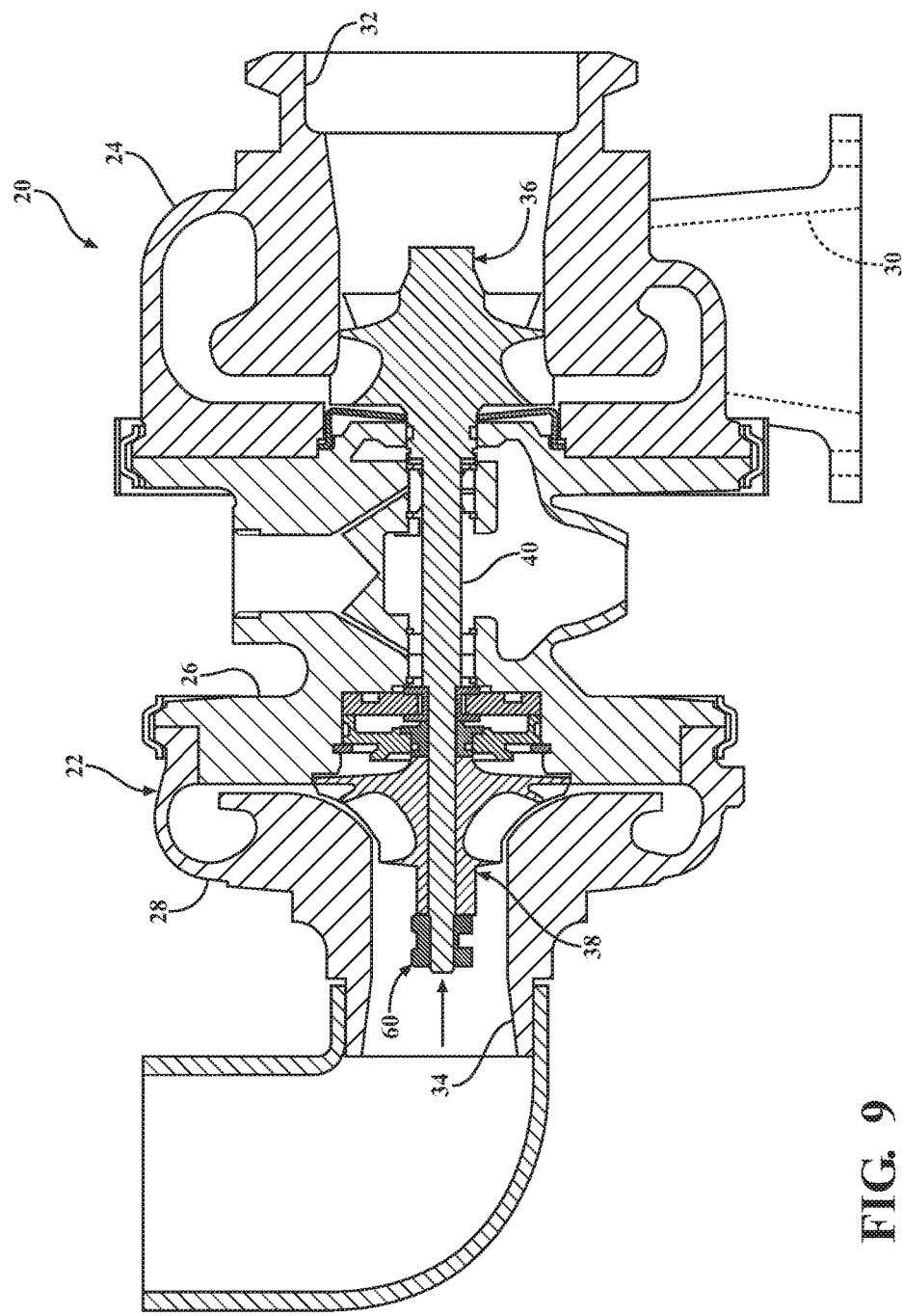
FIG. 9 a sectional view of a turbocharger, according to yet another embodiment of the present invention.
Figure 10:
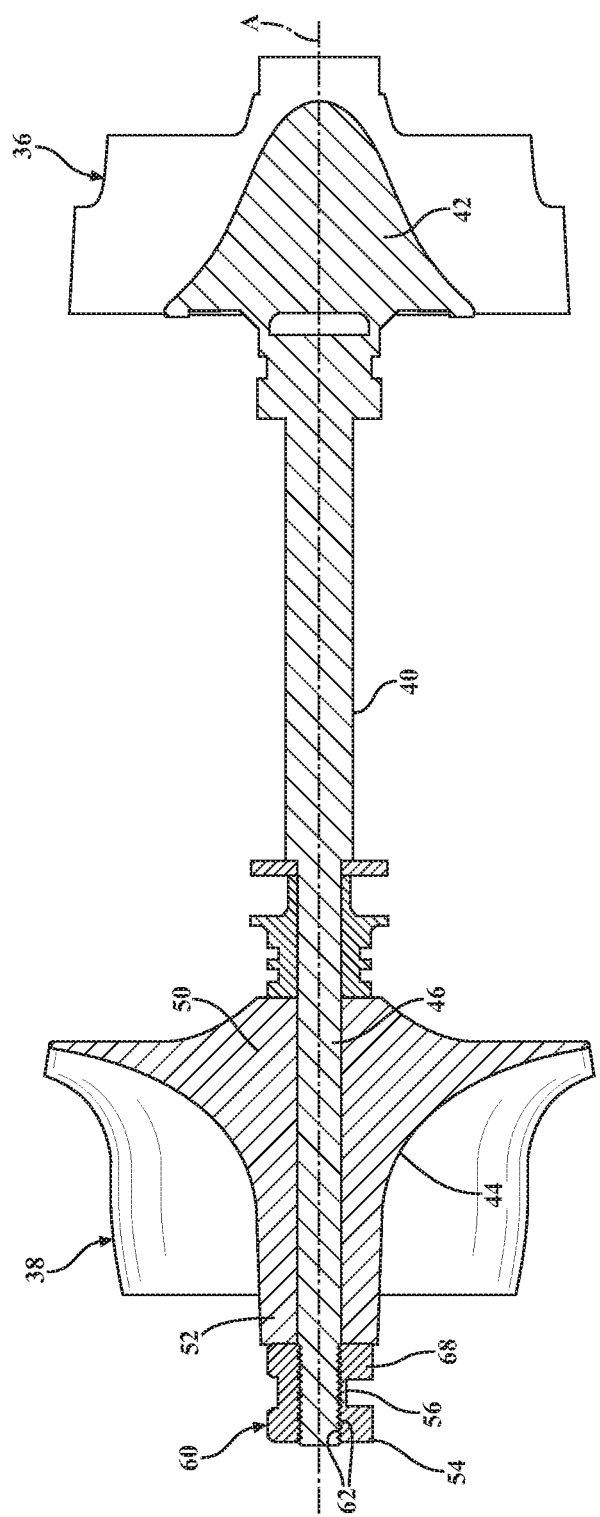
FIG. 10 is an enlarged view of a portion of the turbocharger of FIG. 9.
Figure 11:
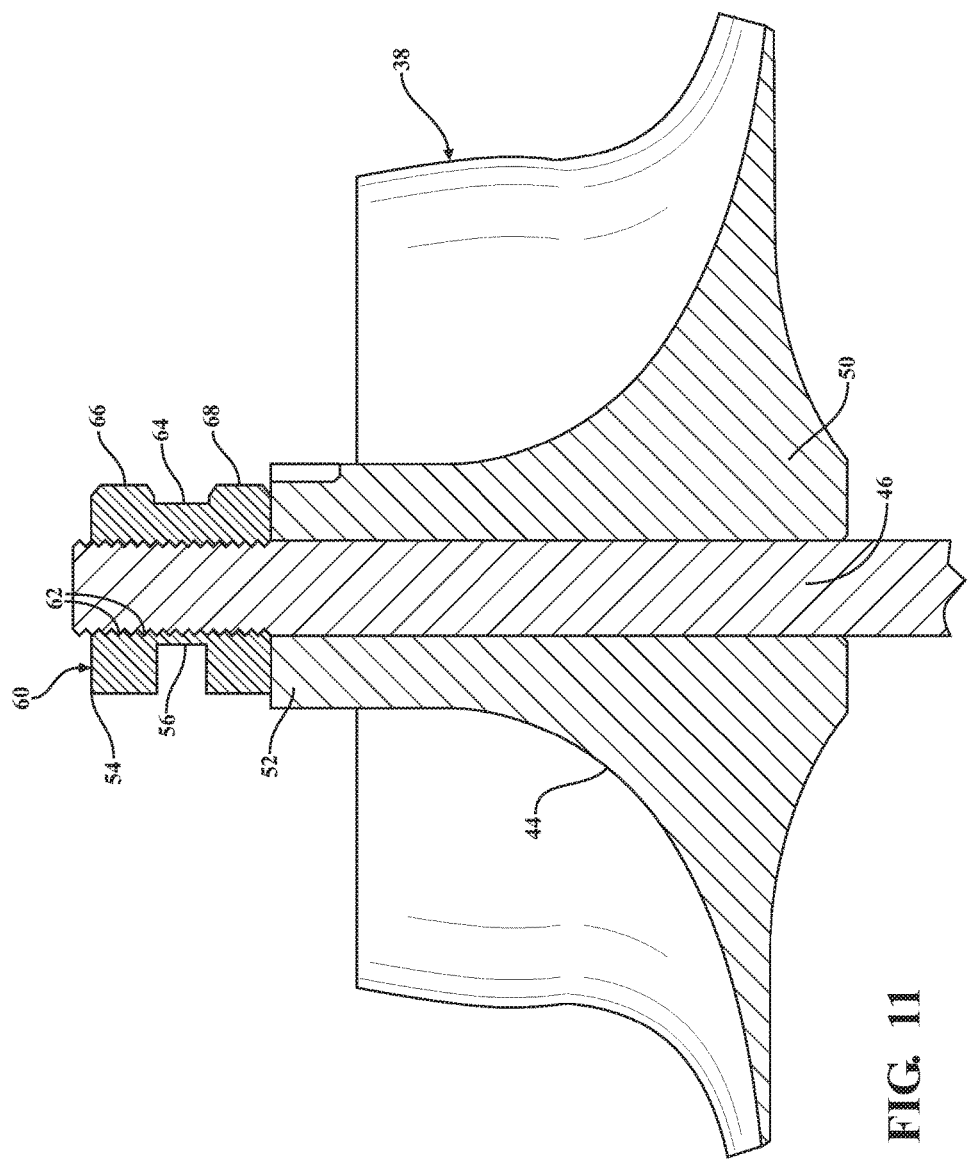
FIG. 11 is an enlarged view of one end of the portion of FIG. 10.
Figure 12:
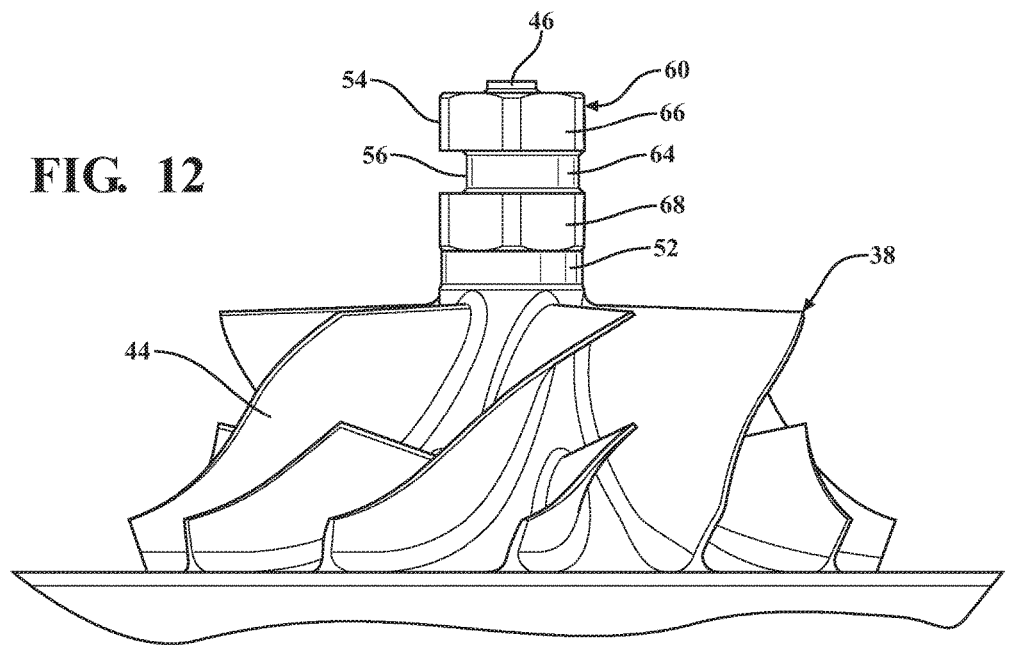
FIG. 12 is an elevational view of one end of the portion of FIG. 10 illustrating a compressor nut.
Figure 13:
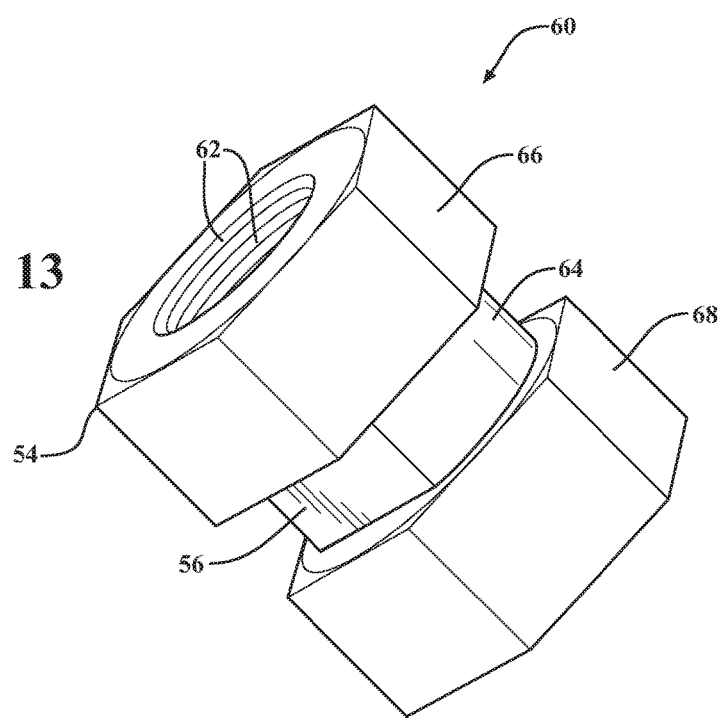
FIG. 13 is a perspective view of the compressor nut of FIG. 12.

Referring now to the figures, where like numerals are used to designate like structure unless otherwise indicated, a turbocharger 20, according to one embodiment of the present invention, is shown in FIGS. 1-3. As illustrated in FIG. 1, the turbocharger 20 includes a housing, generally indicated at 22, having a turbine housing 24, a shaft housing 26, and a compressor housing 28. The turbine housing 26 has a turbine exhaust gas inlet 30 to receive exhaust gas from an internal combustion engine (not shown) and a turbine exhaust gas outlet 32. The compressor housing 28 has a compressor ambient air inlet 34 to receive ambient airflow as indicated by the arrow and a compressor air discharge outlet (not shown) to deliver compressed air to the internal combustion engine. The turbocharger 20 also includes a rotatable turbine portion, generally indicated at 36, disposed in the turbine housing 26 and a rotatable compressor portion, generally indicated at 38, disposed in the compressor housing 28. The turbocharger 20 further includes a rotatable turbocharger shaft 40 coupled to the turbine portion 36 and the compressor portion 38 and rotationally supported by bearings in the shaft housing 26. It should be appreciated that an example of a turbocharger is disclosed in U.S. Patent Application Publication No. 2015/0219121 to King, the entire disclosure of which is hereby expressly incorporated by reference.

Referring to FIGS. 2 and 3, the turbocharger shaft 40 extends along a longitudinal axis A. The turbine portion 36 includes a turbine wheel 42 solidly affixed to one end of the turbocharger shaft 40, becoming a shaft and wheel assembly. The compressor portion 38 includes a compressor wheel 44 coupled to the other end of the turbocharger shaft 40, referred to as a "stub shaft" 46. In the embodiment illustrated, the compressor wheel 44 is in threaded engagement with the stub shaft 46 by a plurality of threads 48. The compressor wheel 44 extends longitudinally between a wheel end 50 facing the turbine portion 36 and a nose end 52 facing the ambient airflow flowing into the compressor ambient air inlet 34. The nose end 52 is generally cylindrical in shape. The compressor portion 36 includes a symmetrical leading edge region 54 facing the ambient airflow flowing into the compressor ambient air inlet 34. In the embodiment illustrated, the nose end 52 of the compressor wheel 44 includes the symmetrical leading edge region 54. The compressor portion 36 also includes an imbalance correction region 56 extending radially inward to correct an imbalance of the turbocharger shaft 40. The imbalance correction region 56 has mass removed to correct the imbalance. The imbalance correction region 56 is disposed longitudinally inboard from the symmetrical leading edge region 54 to preserve the continuity of the symmetrical leading edge region 54 and prevent the imbalance correction region 56 from causing a first order pulsation noise or other aero-acoustic issues. In the embodiment illustrated, the imbalance correction region 56 is cut radially into the nose end 52 of the compressor wheel 44. The depth of the cut varies depending on how much mass is needed to be removed to correct the imbalance. In various embodiments, the imbalance correction region 56 may be made with a ball end mill, flat end mill, grinding wheel, etc. The imbalance correction region 56 may be defined as a planar shape or an arcuate shape extending across the nose end 52 of the compressor wheel 44. It should be appreciated that the imbalance correction region 56 may be positioned in any region longitudinally inboard from the symmetrical leading edge region 54. It should also be appreciated that uniformity of the symmetrical leading edge region 54 is preserved by the imbalance correction region 56 being disposed longitudinally inboard from the symmetrical leading edge region 54. It should further be appreciated that the symmetrical leading edge region 54 is used to protect the imbalance correction region 56 from causing a disturbance in the airflow, which may cause aero-acoustic noises.

Referring to FIGS. 4-8, another embodiment, according to the present invention, of the turbocharger 20 is shown. Like parts of FIGS. 1-3 have like reference numerals. In this embodiment of the turbocharger 20, the compressor portion 38 includes the compressor wheel 44 disposed about the stub shaft 46 and a compressor nut, generally indicated at 60, in threaded engagement with the stub shaft 46 by a plurality of threads 62. The compressor wheel 44 is held in position by a clamp load from the compressor nut 60. In the embodiment illustrated, the compressor nut 60 includes a balance portion 64 disposed about the stub shaft 46 adjacent the nose end 52 of the compressor wheel 44. The compressor nut 60 also includes a fastener portion 66 disposed about and coupled to the stub shaft 46 by the threads 62 adjacent the balance portion 64 such that the balance portion 64 is disposed longitudinally between the fastener portion 66 and the nose end 52 of the compressor wheel 44. The fastener portion 66 includes the symmetrical leading edge region 54 and is free of the imbalance correction region 56. In one embodiment, the fastener portion 66 is hexagonal in shape, but may be any suitable symmetrical shape. The balance portion 64 is generally cylindrical in shape. The imbalance correction region 56 extends radially into the balance portion 64 for correcting an imbalance of the turbocharger shaft 40. The imbalance correction region 56 may be defined as a planar shape or an arcuate shape extending longitudinally and laterally across the balance portion 64. In one embodiment, the imbalance correction region 56 may have a width of 2.0 millimeters and a depth of 1.55 millimeters. The balance portion 64 extends radially and the fastener portion 66 extends radially a distance greater than a radial distance of the balance portion 64. The compressor nut 60 is made of a rigid material such as metal. The compressor nut 60 is integral, unitary, and one-piece. It should also be appreciated that uniformity of the symmetrical leading edge region 54 is preserved by the imbalance correction region 56 being located longitudinally inboard from the symmetrical leading edge region 54. It should further be appreciated that the symmetrical leading edge region 54 is used to protect and prevent the imbalance correction region 56 from causing a disturbance in the airflow, which may cause aero-acoustic noises.

Referring to FIGS. 9-13, yet another embodiment, according to the present invention, of the turbocharger 20 is shown. Like parts of FIGS. 4-8 have like reference numerals. In this embodiment of the turbocharger 20, the compressor portion 38 includes the compressor wheel 44 disposed about the stub shaft 46 and a compressor nut, generally indicated at 60, in threaded engagement with the stub shaft 46 by a plurality of threads 62. The compressor wheel 44 is held in position by a clamp load from the compressor nut 60. In the embodiment illustrated, the compressor nut 60 includes a balance portion 64 disposed about the stub shaft 46. The compressor nut 60 also includes a first fastener portion 66 and a second fastener portion 68 disposed about and coupled to the stub shaft 46 by the threads 62 adjacent each longitudinal end of the balance portion 64 such that the balance portion 64 is disposed between the first fastener portion 66 and the second fastener portion 68 and the second fastener portion 68 is disposed adjacent the nose end 52 of the compressor wheel 44. The first fastener portion 66 includes the symmetrical leading edge region 54 and is free of the imbalance correction region 56. In one embodiment, the first fastener portion 66 and the second fastener portion 68 are hexagonal in shape, but may be any suitable symmetrical shape. The balance portion 64 is generally cylindrical in shape. The imbalance correction region 56 extends radially into the balance portion 64 for correcting an imbalance of the turbocharger shaft 40. The imbalance correction region 56 may be defined as a planar shape or an arcuate shape extending longitudinally and laterally across the balance portion 64. In one embodiment, the imbalance correction region 56 may have a width of 2.0 millimeters and a depth of 1.55 millimeters. The balance portion 64 extends radially and the first fastener portion 66 and second fastener portion 68 extend radially a distance greater than a radial distance of the balance portion 64. The compressor nut 60 is made of a rigid material such as metal. The compressor nut 60 is integral, unitary, and one-piece. It should also be appreciated that uniformity of the symmetrical leading edge region 54 is preserved by the imbalance correction region 56 being located longitudinally inboard from the symmetrical leading edge region 54. It should further be appreciated that the symmetrical leading edge region 54 is used to protect and prevent the imbalance correction region 56 from causing a disturbance in the airflow, which may cause aero-acoustic noises.

Figure 14:
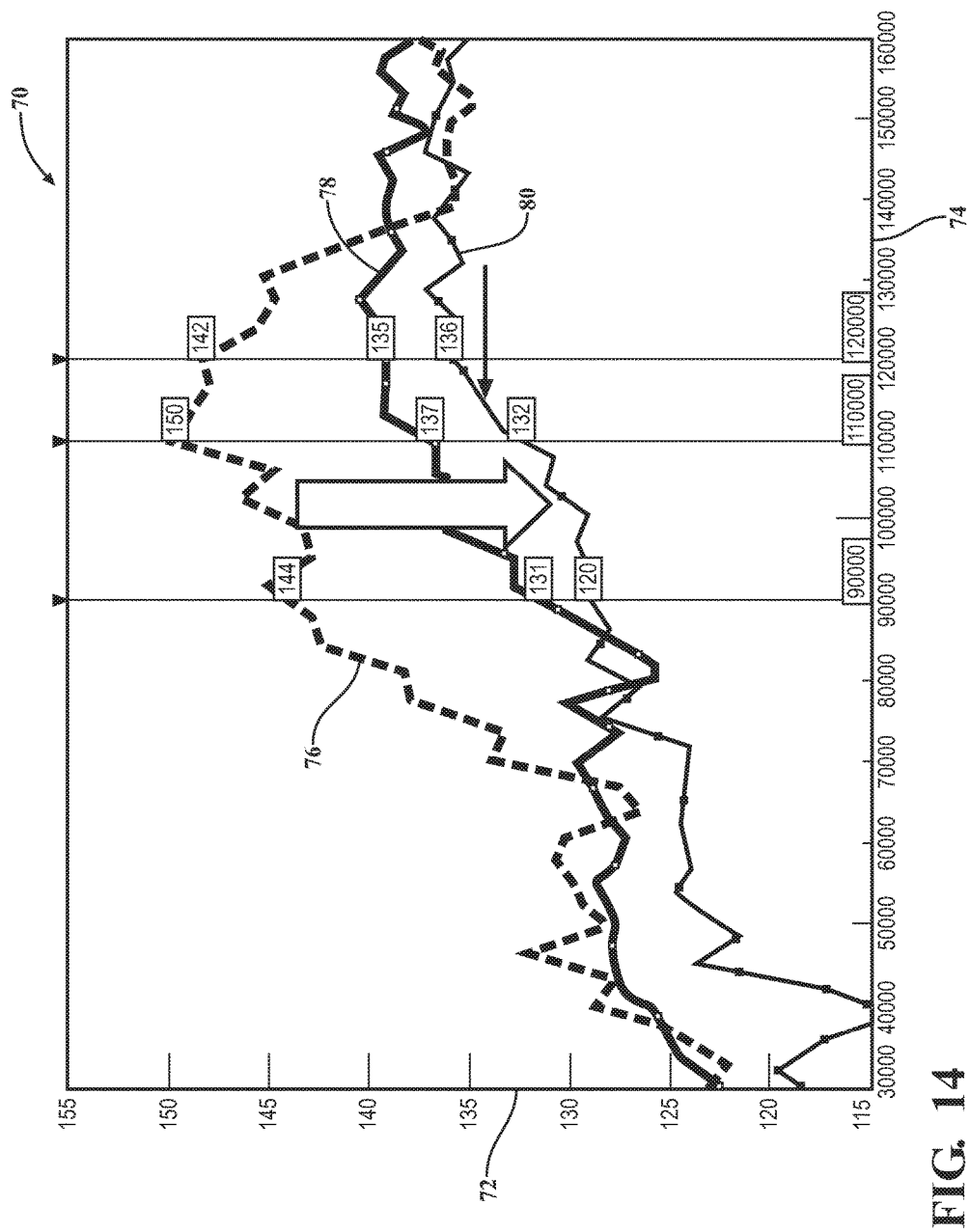
FIG. 14 is a graph of a radial deep imbalance correction for a compressor nut for the turbocharger of FIGS. 4 and 9.

Referring to FIG. 14, a graph 70 of a radial depth imbalance correction for the compressor nut 60 of turbocharger 20 is shown. The graph 70 has a vertical axis 72 of decibels amplitude (pulsation) and a horizontal axis 74 of rpm (rotational speed). The graph 70 also includes plots 76, 78, and 80 of radial depth. The plot 76 is one millimeter radial deep flat cut positioned outboard of the compressor wheel. The plot 80 is one millimeter radial deep flat cut positioned inboard of the compressor wheel. The plot 78 is 20 mg cut deemed acceptable for first order pulsation noise. It should be appreciated that, by locating the radial deep flat cut positioned inboard of the compressor wheel for plot 80 reduces aero-acoustic noise below the deemed acceptable level of plot 78.

Accordingly, the turbocharger 20 of the present invention provides a compressor portion 38 having an imbalance correction region 56 to reduce aero-acoustic noises such as a first order pulsation noise. The compressor portion 38 of the present invention has a symmetric leading edge region 54 that does not generate a pulsation noise. The compressor portion 38 of the present invention has the imbalance correction region 56 disposed longitudinally inboard from an outboard edge or the symmetric leading edge region 54 to preserve a continuity of a leading edge. The symmetric leading edge region 54 of the present invention is used to protect the imbalance correction region 56 or balance cut from causing a disturbance in the flow which may cause aero-acoustic noises. The compressor portion 38 of the present invention can have the imbalance correction region 56 positioned in any region disposed longitudinally inboard from the symmetric leading edge region 54.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A turbocharger comprising:
    a turbine wheel portion to receive exhaust gas from an internal combustion engine;
    a turbocharger shaft coupled to and rotatable by said turbine wheel portion, said turbocharger shaft extending along a longitudinal axis; and
    a compressor wheel portion coupled to and rotatable by said turbocharger shaft, said compressor wheel portion comprising:
    a symmetrical leading edge region facing airflow; and
    an imbalance correction region disposed longitudinally inboard from said symmetrical leading edge region and defined as one of a planar shape and an arcuate shape extending across and radially inward with one solid wall on an opposite side of the imbalance correction region to correct an imbalance of said turbocharger shaft and to reduce aero-acoustic noises.

2. A turbocharger as set forth in claim 1 wherein said compressor wheel portion comprises a compressor wheel disposed about and coupled to said turbocharger shaft.

3. A turbocharger as set forth in claim 2 wherein said compressor wheel extends along said longitudinal axis from a wheel end facing said turbine wheel portion to a nose end spaced longitudinally from said wheel end and facing the airflow.

4. A turbocharger as set forth in claim 3 wherein said nose end includes said symmetrical leading edge region.

5. A turbocharger as set forth in claim 2 wherein said compressor wheel portion includes a compressor nut coupled to said turbocharger shaft adjacent said compressor wheel.

6. A turbocharger as set forth in claim 5 wherein said compressor nut includes a balance portion disposed about said turbocharger shaft adjacent said compressor wheel and having a fastener portion disposed about and coupled to said turbocharger shaft adjacent said balance portion such that said balance portion is disposed between said fastener portion and said compressor wheel to fasten said compressor wheel to said turbocharger shaft.

7. A turbocharger as set forth in claim 6 wherein said fastener portion includes said symmetrical leading edge region and being free of said imbalance correction region.

8. A turbocharger as set forth in claim 6 wherein said balance portion is generally cylindrical in shape.

9. A turbocharger comprising:
    a turbine wheel portion to receive exhaust gas from an internal combustion engine;

a turbocharger shaft coupled to and rotatable by said turbine wheel portion, said turbocharger shaft extending along a longitudinal axis; and a compressor wheel portion coupled to and rotatable by said turbocharger shaft, said compressor wheel portion comprising:

a symmetrical leading edge region facing airflow;

an imbalance correction region disposed longitudinally inboard from said symmetrical leading edge region and extending radially inward to correct an imbalance of said turbocharger shaft and to reduce aero-acoustic noises;

wherein said compressor wheel portion comprises a compressor wheel disposed about and coupled to said turbocharger shaft;

wherein said compressor wheel portion includes a compressor nut coupled to said turbocharger shaft adjacent said compressor wheel;

wherein said compressor nut includes a balance portion disposed about said turbocharger shaft adjacent said compressor wheel and having a fastener portion disposed about and coupled to said turbocharger shaft adjacent said balance portion such that said balance portion is disposed between said fastener portion and said compressor wheel to fasten said compressor wheel to said turbocharger shaft; and wherein said imbalance correction region extends radially into said balance portion.

10. A turbocharger comprising:

a turbine wheel portion to receive exhaust gas from an internal combustion engine;

a turbocharger shaft coupled to and rotatable by said turbine wheel portion, said turbocharger shaft extending along a longitudinal axis; and a compressor wheel portion coupled to and rotatable by said turbocharger shaft, said compressor wheel portion comprising:

a symmetrical leading edge region facing airflow;

an imbalance correction region disposed longitudinally inboard from said symmetrical leading edge region and extending radially inward to correct an imbalance of said turbocharger shaft and to reduce aero-acoustic noises;

wherein said compressor wheel portion comprises a compressor wheel disposed about and coupled to said turbocharger shaft;

wherein said compressor wheel portion includes a compressor nut coupled to said turbocharger shaft adjacent said compressor wheel;

wherein said compressor nut includes a balance portion disposed about said turbocharger shaft adjacent said compressor wheel and having a fastener portion disposed about and coupled to said turbocharger shaft adjacent said balance portion such that said balance portion is disposed between said fastener portion and said compressor wheel to fasten said compressor wheel to said turbocharger shaft; and wherein said imbalance correction region is defined as one of a planar shape and an arcuate shape extending across said balance portion.

11. A turbocharger as set forth in claim 6 wherein said balance portion extends radially and said fastener portion extends radially a distance greater than a radial distance of said balance portion.

12. A turbocharger comprising:

a turbine wheel to receive exhaust gas from an internal combustion engine;

a turbocharger shaft coupled to and rotatable by said turbine wheel, said turbocharger shaft extending along a longitudinal axis, said turbocharger shaft having a threaded portion;

a compressor wheel coupled to and rotatable by said turbocharger shaft without a locking nut to deliver compressed air to the internal combustion engine, said compressor wheel extending along said longitudinal axis from a wheel end facing said turbine wheel to a nose end facing airflow spaced longitudinally from said wheel end, said compressor wheel having a threaded bore in threaded engagement with said threaded portion; and said nose end including a symmetrical leading edge region facing the airflow and an imbalance correction region disposed longitudinally inboard from said symmetrical leading edge region and defined as one of a planar shape and an arcuate shape extending across and radially inward with one solid wall on an opposite side of the imbalance correction region to correct an imbalance of said turbocharger shaft and to reduce aero-acoustic noises.

13. A turbocharger comprising:

a turbine wheel to receive exhaust gas from an internal combustion engine;

a turbocharger shaft coupled to and rotatable by said turbine wheel, said turbocharger shaft extending along a longitudinal axis;

a compressor wheel coupled to and rotatable by said turbocharger shaft to deliver compressed air to the internal combustion engine, said compressor wheel extending along said longitudinal axis from a wheel end facing said turbine wheel to a nose end facing airflow spaced longitudinally from said wheel end; and a compressor nut comprising a balance portion disposed about said turbocharger shaft adjacent said nose end of said compressor wheel and a fastener portion disposed about and coupled to said turbocharger shaft adjacent said balance portion such that said balance portion is disposed between said fastener portion and said nose end of said compressor wheel to fasten said compressor wheel to said turbocharger shaft; and said fastener portion having a symmetrical leading edge region facing the airflow and said balance portion having an imbalance correction region disposed longitudinally inboard from said symmetrical leading edge region and extending radially inward to correct an imbalance of said turbocharger shaft and to reduce aero-acoustic noises.

14. A turbocharger as set forth in claim 13 wherein said imbalance correction region is defined as one of a planar shape and an arcuate shape extending across said balance portion.

15. A turbocharger as set forth in claim 13 wherein said balance portion extends radially and said fastener portion extends radially a distance greater than a radial distance of said balance portion.

* * * * *